United States Patent [19]
Platzman

[11] 3,794,966
[45] Feb. 26, 1974

[54] AUTOMATIC VEHICLE CLASSIFICATION AND TICKET ISSUING SYSTEM

[76] Inventor: Michael M. Platzman, 541 Green Pl., Woodmere, N.Y. 11598

[22] Filed: May 1, 1972

[21] Appl. No.: 249,068

[52] U.S. Cl............... 340/31 R, 340/51, 235/31
[51] Int. Cl............................................. G08g 1/015
[58] Field of Search...... 340/51, 31 R; 235/61.11 R, 235/61.9

[56] References Cited
UNITED STATES PATENTS
3,018,469  1/1962  Grant et al...................... 340/51 X
3,705,976  11/1970  Platsman.......................... 340/51 X

*Primary Examiner*—William C. Cooper
*Attorney, Agent, or Firm*—Leonard H. King

[57] ABSTRACT

An automatic vehicle classification and ticket issuing system for vehicle toll facilities having a ticket issuing device alongside a discretely identified single lane, single feed entering lane. A detector spaced from the ticket issuing device detects characteristics of the vehicle and based upon these characteristics, a control system classifies the vehicle and has the ticket issuing device issue an appropriate ticket. The control system has a memory capability so that it can store the classifications of a number of successive vehicles and appropriately issue the tickets. Vehicle detection and barrier devices control the flow of traffic to properly space the vehicles for proper operation of the system.

17 Claims, 2 Drawing Figures

AUTOMATIC VEHICLE CLASSIFICATION AND TICKET ISSUING SYSTEM

The aforementioned abstract is neither intended to define the invention of the application, which of course, is measured by the claims, nor is it intended to be limiting as to the scope of the invention in any way.

This invention relates to vehicle toll roads and parking facilities and, more particularly, to a system for automatically classifying the type of vehicle using the toll facility and automatically issuing a ticket in accordance with the classification.

BACKGROUND OF THE INVENTION

With the increased usage of vehicles for transportation there has also resulted an increase in the use of toll roads whereby the driver is charged for the use of the roadway. Also, to accommodate parking of the vehicles, parking facilities have been established in numerous locations. In both toll roads as well as parking facilities, one of the widely accepted methods of operation is to issue a ticket to the vehicle driver upon entrance to the parking facility or toll road, and upon exiting a fee is collected in accordance with information included on the ticket. For example, on a toll road such as a turnpike, as a vehicle enters, a ticket is presented to him which identifies the class of the vehicle and the location of the toll booth at the point of entrance. Other information may be included such as the date and time of entrance. In parking facilities, for example, a ticket indicating the time and class of vehicle is presented upon entrance, and upon leaving the facility, the fee is calculated based upon information included on the ticket.

The classification of the vehicle is generally of utmost importance since the fee schedule is usually based upon such classification. Trucks having three or four axles would generally be charged more than standard automobiles with two axles. Similarly, trucks having four wheels per axle will generally fall into a different classification than trucks with two wheels per axle. In parking facilities as well, the size, weight, and type of vehicle generally will determine the fee schedule. As a result, at the point of entry into the facility, a particular card corresponding to the particular class of the vehicle is issued. Alternately, a standard card may be used and the card may include locations for punching or marking of the card to indicate the class of the vehicle.

In the past, it has been generally accepted to use manual distribution of cards at the point of entry since visual classification of the vehicle was the only accurate method available. More recently, instruments including treadles have been developed which have the capability of automatically classifying the vehicle crossing it. One of such classifying treadle devices is described in copending application entitled, Wheel Sensing Apparatus, filed on: July 1, 1971, under Ser. No. 158,843. The treadle therein described is capable of providing axle count, wheel width size and wheels per axle count. Such information is generally sufficient to provide adequate classification of the vehicles.

Although such automatic classification devices are available, they have heretofore generally been used merely for computational purposes to record the number and type of vehicles using the facility as well as to provide an automatic check upon the toll collector who manually distributes the tickets at the point of entry. Automatic distribution of the tickets based upon vehicle classification from the treadle detectors has heretofore been unsuccessful because of numerous problems. Firstly, the automatic classification is based upon the capability of separating each vehicle from the following vehicle. In order to be able to determine which axles belong to a particular vehicle, it is a necessary requirement to distinguish between subsequent vehicles. Tailgating by one vehicle of another confuses the classification treadle detectors and prevents proper classification. Also, since vehicles are of different lengths, it has not been possible to provide a single system for use by both small vehicles such as foreign automobiles as well as large multi-axle trucks. Still further problems that prevented successful implementation of automatic issuing and classification systems resulted from the variations in traffic patterns and the difficulties in controlling the flow of traffic in proper sequence across the equipment.

It is, therefore, an object of this invention to provide an automatic vehicle classification and ticket issuing system which avoids the aforementioned problems of the prior art.

A further object of the invention is to provide an automatic vehicle classification and ticket issuing system useful at entrance lanes of toll road facilities.

Still a further object of the invention is to provide an automatic vehicle classification and ticket issuing system useful at entrance lanes of parking facilities.

A still further object of the invention is to provide an automatic vehicle classification and ticket issuing system using a treadle which can classify vehicles crossing over it based on the number of axles, the number of wheels per axle and the width of the wheels.

A still further object of the invention is to provide an automatic vehicle classification and ticket issuing system wherein the flow of traffic to the ticket issuing booth is regulated to provide for single feed passage.

Yet another object of the invention is to provide an automatic vehicle classification and ticket issuing system which can accurately classify each individual vehicle using the system.

A still further object of the invention is to provide an automatic vehicle classification and ticket issuing system which can memorize a number of vehicle classifications successively and subsequently provide the issuance of the tickets in proper succession to the appropriate vehicles.

A still further object of the invention is to provide an automatic vehicle classification and ticket issuing system which can accommodate vehicles of varying types and sizes.

Still a further object of the invention is to provide a vehicle classification and automatic ticket issuing system which automatically sounds an alarm should the vehicle driver neglect to remove the ticket at the point of issuance.

A further object of the invention is to provide an automatic vehicle classification and ticket issuing system which controls traffic approaching the ticket issuing booth so as to prevent the problem of tailgating whereupon an alarm is sounded should tailgating be performed by a vehicle.

SUMMARY OF THE INVENTION

Briefly, this invention includes a ticket issuing machine capable of automatically issuing tickets to vehicles passing adjacent to it. An approach lane is provided leading up to the ticket issuing device and permitting only single lane traffic through the approach. Downstream from the ticket issuing device spaced a first distance therefrom is a barrier which normally prevents traffic thereacross. This barrier is opened only when a ticket is removed from the ticket issuing device. A first detector is provided adjacent to the ticket issuing device such that as the vehicle crosses the detector subsequent to removing the ticket from the ticket issuing device, the barrier is again closed. Upstream from the ticket issuing device spaced at a second distance therefrom, is included an automatic vehicle classification detector. This detector is typically a treadle placed on the roadway which can detect characteristics of the vehicle crossing it which characteristics are suitable for classifying the vehicle. A vehicle presence detector is included with the automatic classifying detector and detects the beginning and end of a vehicle crossing the vehicle presence detector. Spaced a third distance further upstream from the automatic classifying detector and vehicle presence detector is placed a second barrier. The second barrier is normally in an open position and closes to prevent further traffic thereacross when a vehicle is detected by the vehicle presence detector. When the vehicle passes from the sphere of detection of the vehicle presence detector, the second barrier is opened permitting further traffic flow thereacross. This, in effect, provides a single vehicle feed through the approach lane to the ticket issuing device. The approach lane can be extended a fourth distance upstream from the second barrier and widened at that point to provide an approach entrance for vehicles to decelerate upon entering the approach lane.

The classification information detected by the automatic classification detector is communicated to a control system which is in electrical contact with the ticket issuing device. The control system selects the classification based upon the characteristics detected and prints a ticket in accordance with the classification. This ticket is issued by the ticket issuing device for removal by the vehicle driver as he passes the issuing device. The control system includes a memory which can retain the classifications of a number of vehicles crossing the automatic classifying detector. Information is stored in sequence and the tickets are punched and issued successively to provide the appropriate ticket for the appropriate vehicle. Alarms are provided within the system which will automatically sound upon a vehicle crossing either barrier when the barriers are in a closed position.

The heretofore mentioned objects of the invention are carried out by the above brief description which will be further clarified hereinafter by the more detailed description of the invention taken in conjunction with the accompanying drawings.

DESCRIPTION OF ONE EMBODIMENT OF THE INVENTION

Figure 1:
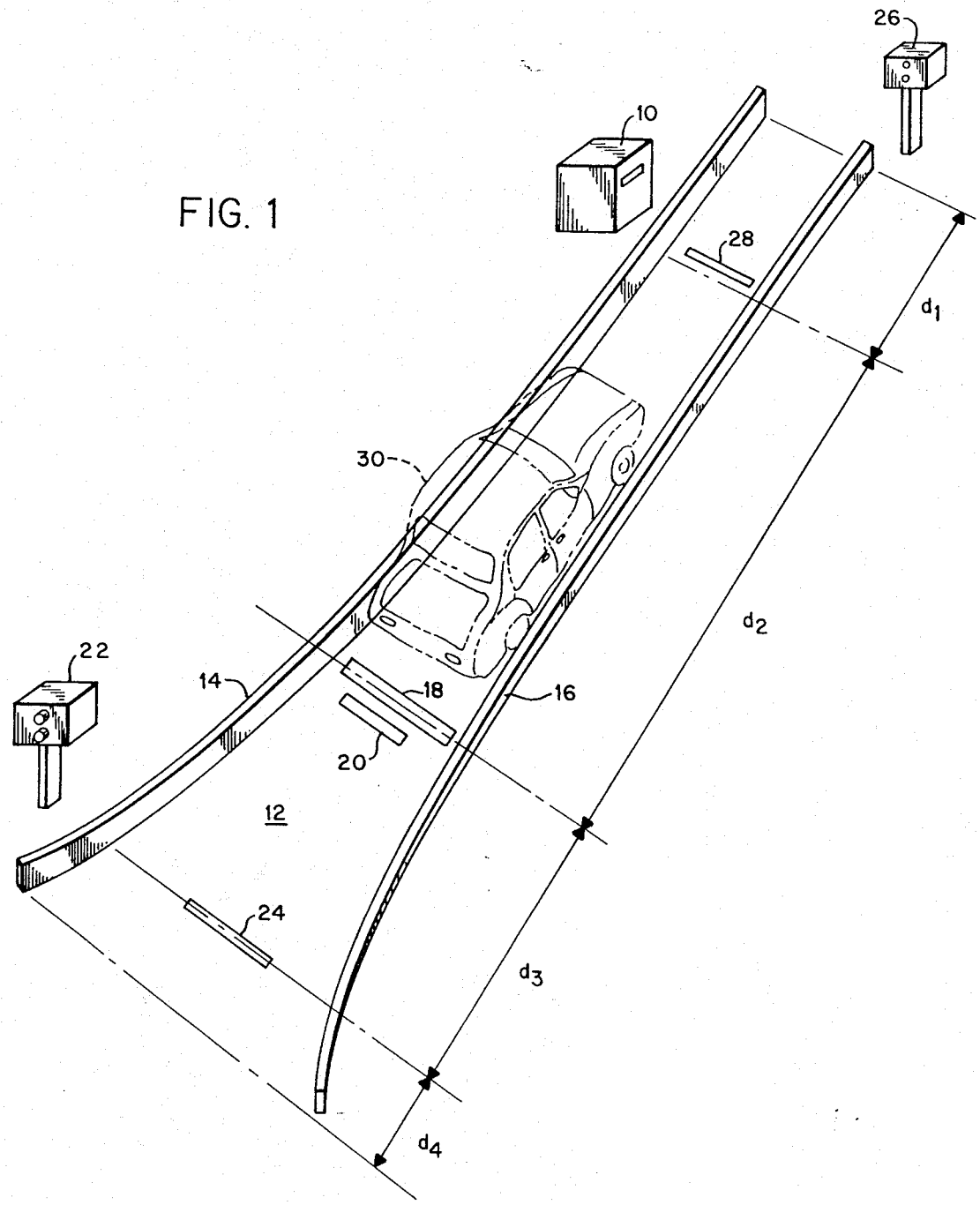
FIG. 1 is a pictorial view of the vehicle classification and automatic ticket issuing system in accordance with this invention.

Referring now to FIG. 1, there is shown a pictorial representation of the automatic classification and ticket issuing system of the present invention including a ticket issuing device 10 placed alongside and near one end of an approach lane shown generally at 12. The approach lane is arranged to permit only one lane of traffic across it and is shown here as comprising raised side curbings 14 and 16 spaced apart to permit only a single vehicle therebetween. The spacing should be wide enough to permit passage of the widest type of vehicle permitted to use the toll facility. At the upsteam end of the lane, the spacing between the opposing raised concrete curbings is wider so that entering traffic will not collide with the curbing but will have an opportunity to enter the lane without difficulty and decelerate upon entering into the lane. Although curbing is shown, it is understood that other means such as guard rails, or traffic dividers could similarly be used. Space upstream from the ticket issuing device 10 at a distance $D_2$ therefrom is placed a vehicle classification detector shown generally at 18. This detector typically is a treadle placed on the pavement of the approach lane and is capable of detecting characteristics of the vehicle crossing over it which permit classification of the vehicle therefrom. Placed adjacent to the automatic classification detector 18 is a vehicle presence detector shown generally at 20. Detector 20 operates to give a first signal as a vehicle enters within its sphere of detection and provides a second signal as the vehicle leaves its sphere of detection. Typically, such detectors can be of the photogating type which would require two or three photo cells with cross beams across the lane, usually placed both directly as well as angularly. Such detectors provide rays of light which are intercepted as the vehicle crosses its light path and provides a signal indicating the presence of the vehicle. This signal is terminated as the vehicle leaves the path of the rays. A further type of detector, which has been found to be more beneficial, is of the type known as the RF loop type. As a vehicle enters the RF loop, the fixed frequency of the loop is changed thereby providing a first signal. When the vehicle leaves the sphere of detection of the RF loop, the original steady state frequency is resumed and a second signal is provided.

Spaced upstream a distance $D_3$ from the automatic classification detector 18 and vehicle presence detector 20 is placed a barrier 22. The barrier is shown as a traffic light having red and green traffic signals. However, other type of barriers could be used including a bar which is raised and lowered in accordance with the traffic control signal. Barrier 22 is connected to the vehicle presence detector 20 such that when the presence of a vehicle is detected by detector 20, the barrier 22 is closed, in this case the red light is switched on. As a vehicle passes out of the sphere of detection of the vehicle presence detector 20, barrier 22 is opened, in this case the green light is switched on. The barrier 22, therefore, provides for single vehicle feed across its transverse position in the lane. This insures that only a single vehicle at a time will cross the automatic classification detector 18. Since the automatic classification detector 18 must count the number of axles per vehicle, it is absolutely necessary that it be determined where a vehicle ends and the beginning of the next vehicle occurs. As a result, tailgating, whereupon the vehicles are so close together to effectively provide a continuing series of axles, would confuse the classification detector 18. By providing the barrier 22, once a vehicle comes into the sphere of detection of the vehicle presence detector 20, subsequent vehicles are stopped so that the classification detector can classify all the characteristics for a particular vehicle independently of the subsequent vehicles.

Should a vehicle nevertheless cross barrier 22 when it is in a closed position, in this case a red light, and an alarm signal will be sounded. Detector 24 which can be, for example, a treadle placed in the surface of the lane adjacent barrier 22, works in conjunction with barrier 22 such that when barrier 22 is in a closed position, in this case providing a red light, and detector 24 is traversed by a vehicle, the alarm will be sounded.

To insure that proper operation of the system is being carried out by the vehicle drivers, a further barrier 26 can be placed downstream from the ticket issuing device 10, at a distance of $D_1$ therefrom. Barrier 26 is shown as a traffic light having red and green indications for controlling the flow of traffic therethrough. However, it is understood that other types of barrier devices could be used in place of it. Normally, the barrier 26 is in a closed position, in this case indicating a red light. When a ticket is ejected from the ticket issuing device 10, the barrier 26 remains in a closed position until such time as the vehicle driver removes the ticket from the ticket issuing device 10. At such time, the barrier 26 is opened, in this case by indicating a green light thereby permitting the vehicle to continue its movement along the path leaving the toll lane. Should the vehicle driver pass through the lane without removing the ticket ejected from the ticket issuing device 10, the barrier 26 would cause an alarm to sound which would call the attention of appropriate personnel. A vehicle crossing detector 28 can be placed adjacent to the ticket issuing device 10. For example, this can be a treadle placed on the surface of the lane. After the ticket has been taken by the vehicle driver and the barrier 26 is opened, the barrier will remain open until the vehicle crosses the detector 28 whereupon the barrier 26 will again close and remain in a closed position.

The distances $D_1$ to $D_4$ can be prearranged in order to control the flow of traffic in accordance with desired characteristics of the facility. However, certain restrictions on the distances are required. For example, the distance $D_2$, which represents the distance from the automatic classifying detector 18 to the ticket issuing device 10, must necessarily be slightly greater than the largest vehicle to be using the facility. For example, a truck crossing the detector 18 with its front wheels must be able to completely pass over the detector 18 with its rear axle before a complete classification of the vehicle will be attained and the ticket issued. Therefore, the distance $D_2$ should be approximately 110 feet to accommodate the presently available truck length of 108 feet. Because of the great length of the approach $D_2$, it is also possible that in the same distance there could be 10 smaller type vehicles between the time of the classification of the first and the time that the first vehicle approaches the ticket issuing device 10. As a result, the ticket issuing device 10 must include equipment which will memorize as many as ten classifications successively and provide for the issuance of the tickets in proper succession. Once the ticket is removed, the classification information which was memorized within the device 10 can be wiped out thereby providing available storage room for succeeding classification information.

Since the purpose of the distance $D_3$ is to prevent tailgating thereby providing a clear and distinct separation between successive vehicles for classification purposes, the distance $D_3$ should necessarily be slightly less than the smallest vehicle permitted to use the facility. As a result, once a vehicle enters the sphere of detection of the vehicle presence detector 20, a subsequent vehicle, closely spaced to the first vehicle, would be located on the upstream side of the barrier 22 and would be prevented from proceeding across the barrier position. Thus, the distance $D_3$ should be approximately 10 feet.

The distance $D_4$, represents the distance from the single vehicle feed barrier 22 to the beginning of the approach lane to the toll booth. This distance should be provided sufficiently long to permit a car to decelerate as it enters into the narrowing traffic lane of the toll booth. For highways where vehicles travel at greater speeds, the decelerating distance would be greater and the distance $D_4$ should be made appropriately longer. For parking facilities, where vehicles approach at a very slow speed, the distance $D_4$ can be relatively short.

The distance $D_1$, represents the spacing between the ticket issuing device 10 and the barrier 26 and should be made short enough to provide the vehicle driver a clear view of the barrier 26 which can also serve to remind the vehicle driver to remove the ticket from the ticket issuing device 10, and indicate the permissibility of his proceeding along the lane subsequent to his removal of the ticket from the ticket issuing device 10.

In operation, as a vehicle, shown generally at 30, approaches the toll booth lane 12, the barrier 22 would be open permitting the vehicle to enter. As soon as the vehicle passes, the vehicle presence detector 20, barrier 22 would close thereby preventing further vehicles from continuing along the traffic lane. The automatic classification detector 18 would detect appropriate characteristics of the vehicle and communicate the characteristics to the ticket issuing device 10 which includes electronic or mechanical control equipment. The issuing device 10 would classify the vehicle based upon the characteristic information from the automatic classifying detector 18 and would memorize the information for further availability. The memorized information is then sequentially read out to a ticket printer which punches a ticket in accordance with the particular classification and issues it at the appropriate opening in the ticket issuing device 10. The ticket would remain held at the opening until the vehicle 30 arrives at the ticket issuing device 10 and accepts the ticket. The barrier 26 would then be opened permitting the vehicle 30 to leave the traffic lane and proceed on its regular course. Subsequent vehicles crossing the detectors 18 and 20 would similarly be detected and the characteristics transmitted to the device 10 to be classified and memorized in sequence. As one ticket is removed from device 10, the next sequentially memorized classification is read and a ticket punched accordingly, whereupon the next ticket is then available for the next vehicle approaching. As a result, the tickets are issued in sequence in accordance with the passage of the vehicles across the detectors 18 and 20.

While the device 10 is shown having a single opening for the ejection of a ticket, it is possible to have a plurality of openings, each one issuing a particular type of classified card. Instead of punching a single type standard card with the classification information, the control equipment would select a particular type card in accordance with the classification information and eject the particular card from one of the plurality of openings. Similarly, a single opening could be had and a plurality of different types of classification cards used, whereupon the particular card would be selected in accordance with the classification characteristics and the selected card would be ejected from the single opening in the device 10.

It is further understood that instead of providing the device 10 with a memorizing capability, it would be possible to use the barrier 22 to prevent vehicles from further proceeding along the approach lane until such time as the preceding vehicle 30 has removed the ticket from the issuing device 10. In this embodiment, once the automatic classifying detector 18 transmits the classification characteristics to the device 10, and a card is printed, no further vehicles would proceed across the detector until the ticket is removed from the device 10. Although this embodiment would reduce the complexity of the device 10, it would provide for a slower flow of traffic.

Figure 2:
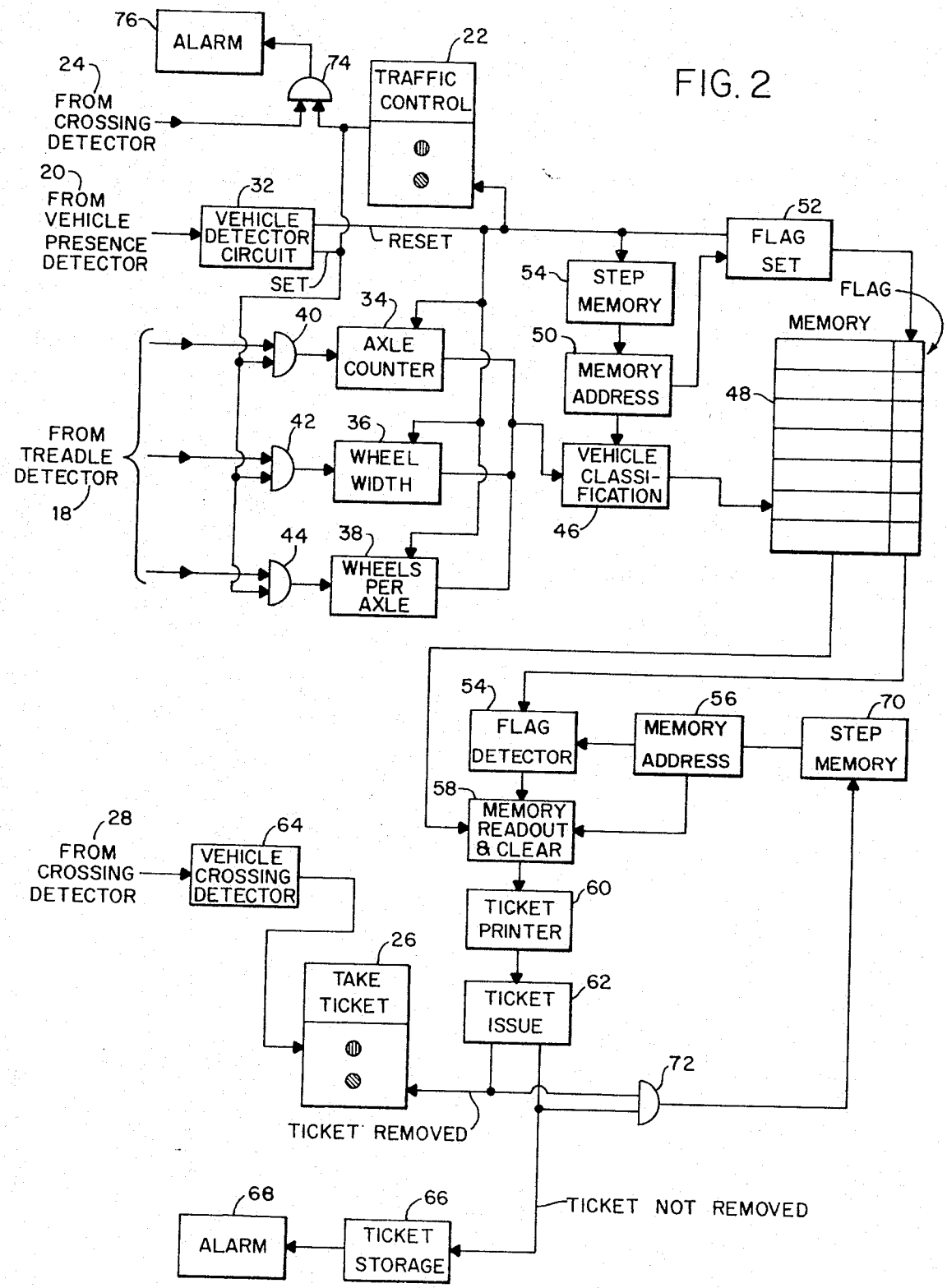
FIG. 2 is one embodiment of the control system used for the invention.

Referring now to FIG. 2, there is shown one embodiment of the electrical control system of the automatic classification and ticket issuing system shown in FIG. 1. As a car passes the vehicle presence detector 20, a signal is sent to a vehicle detector circuit 32 which produces a set output. When the vehicle leaves the sphere of detection of the vehicle presence detector 20, the vehicle detector circuit 32 produces a "reset" output. The characteristic information from the treadle detector 18 is sent to an axle counter 34, a wheel width detector 36, and a wheel per axle counter 38. The information passes to these devices 34, 36, 38, through respective AND gates 40, 42, 44, each of which are enabled by the "set" signal from the vehicle detector circuit 32. In this manner, the units 34, 36, 38, only operate when the presence of a vehicle is detected by detector 20.

When a vehicle is detected, the set signal is sent to the traffic control unit 22 to turn on the red signal on the barrier, thereby preventing further vehicles from proceeding along the approach lane.

The information from axle counter 34, wheel width circuit 36, and wheels per axle counter 38, is sent to a vehicle classification unit 46 which combines the information and determines the class of vehicle which has passed the detector 18. The information from classification unit 46 is then stored in the information storage section of memory 48 in the address as controlled by memory address unit 50.

When the vehicle leaves the sphere of detection of the detector 20, the reset signal from vehicle detector circuit 32 resets the axle counter 34, the wheel width the wheel width circuit 36 and the wheels per axle counter 38. Also, the traffic control unit 22 is changed to open the barrier, in this case turning on the green light, thereby permitting the next car to travel through the approach lane. The reset signal is also sent to a flag set circuit 52 which sets a flag in the memory 48 at the address controlled by memory address 50. This could typically be a parity bit at the end of the stored word. The reset signal also modifies the memory address 50 through the step memory unit 54 thereby providing a new location for the storage of the next information.

As subsequent vehicles cross the detectors 18, 20, the information is recorded and entered into the subsequent memory locations and the flag of each location is then set indicating the presence of classification information in that memory address location.

A flag detector 54 scans the flag position of the memory address controlled by memory address unit 56. When it detects the presence of a flag, indicating that classification information is stored in that memory address location, it signals memory readout and clear circuitry 58 to read the classification information contained in that memory storage location address and then clear the memory location including the flag set signal. The information read out in circuit 58 is fed to a ticket printer 60 which prints a ticket in accordance with the classification information and then signals the ticket issue unit 62 to eject the ticket.

When the vehicle approaches the ticket issue device and removes the ticket, the ticket issue unit 62 provides a ticket removed signal which turns the control barrier 26 to its green light indicating that the vehicle may proceed out of the toll lane. When the vehicle has passed the control barrier 28 (as shown in FIG. 1), a signal is sent to vehicle crossing detector 64 which returns the control barrier 26 to its closed position, in this case turning it back to its red light condition. Should the ticket not be removed from the ticket issuing device, so as not to have the wrong ticket presented to the subsequent vehicle, the ticket drops into a ticket storage unit 66 and simultaneously an alarm 68 is sounded calling the attention of control personnel to the fact that a ticket has been issued and not removed by the vehicle driver.

Whether a ticket removed signal or a ticket not removed signal is generated by the ticket issue unit 62, the memory address 56 is stepped by step memory unit 70 through OR gate 72. In this manner, the flag detector is now able to scan the next memory location to determine if a flag set has been set indicating information classifying the next vehicle.

By means of the control equipment shown in FIG. 2, the system can memorize the classification information of a number of vehicles depending upon the capacity of the memory unit 48. Subsequently, the tickets will be printed sequentially in the same sequence as the vehicles went past the detectors, wherein each ticket is printed immediately upon the removal of the previous ticket.

Should a vehicle not stop at the barrier 22 when the barrier indicates a red signal, the vehicle will cross detector 24. The simultaneous occurrence of a signal from detector 24 when a closed condition from barrier 22 has enabled AND gate 74, will sound alarm 76. The sounding of this alarm notifies personnel that a vehicle has been tailgating and improper classification will result.

Although the embodiment shown in FIG. 2 uses logic blocks, it is to be understood that the invention could be implemented using electro-mechanical devices as is known in the art. Similarly, the memory unit could be a computer memory which serves as a central computer for all of the issuing devices or could be a local memory unit such as a shift register or a recirculating delay line as is known in the art.

There has been disclosed heretofore the best embodiment of the invention presently contemplated; however, it is to be understood that various changes and modifications may be made thereto without departing from the spirit of the invention.

What I claim as new and desire to secure by Letters Patent is:

1. An automatic classification and ticket issuing system for vehicle toll facilities adapted to be installed in a discretely identified single lane traffic entering terminal comprising:

ticket issuing means located adjacent said lane for issuing toll tickets bearing any one of a plurality of different vehicle classification codes;

vehicle characteristic detector means located along said lane upstream from said ticket issuing means;

vehicle presence detector means located along said lane adjacent said vehicle characteristic detector means;

first vehicle direction means normally in a first condition permitting vehicle passage and having a second condition prohibiting vehicle passage located along said lane upstream of and controlled by said vehicle presence detector means to switch to its second condition during the time that the presence of a vehicle is detected; and control means including means for receiving the characteristics detected by said vehicle characteristic detector means, means for classifying the vehicle with one of said classification codes based on said characteristics, and means for operating said ticket issuing means to issue a ticket with the classification code classifying the vehicle.

2. A system as in claim 1 and further including second vehicle direction means located downstream from said ticket issuing means and normally in a first condition prohibiting vehicle passage traverses and having a second condition permitting vehicle passage, said second vehicle direction means being switched to its second condition when said ticket is removed from said ticket issuing means.

3. A system as in claim 2 further comprising vehicle crossing detector means located along said lane adjacent said ticket issuing means and electrically connected to said second vehicle direction means for switching said second vehicle direction means back to its first condition when the passage of a vehicle is detected.

4. A system as in claim 3 and further including alarm means electrically connected to said second vehicle direction means and said crossing detector means for sounding an alarm when said second vehicle direction is in its first condition and said crossing detector detects the passage of a vehicle.

5. A system as in claim 1 and further including a vehicle crossing detector means located along said lane adjacent said first vehicle direction means, and alarm means electrically connected to said first vehicle direction means and said vehicle crossing detector means for sounding an alarm when said first vehicle direction is in its second condition and said vehicle crossing detector means detects the passage of a vehicle.

6. A system as in claim 1 wherein said vehicle presence detector means includes an RF loop connected to said control means for normally producing a first frequency and for producing a different frequency while a vehicle is within said RF loop.

7. A system as in claim 1 wherein said vehicle presence detector means includes a plurality of photoelectric devices whose output beams are cut by the passing of a vehicle therethrough.

8. A system as in claim 1 wherein said vehicle characteristic detector means is a treadle inserted in the surface of said lane.

9. A system as in claim 8 wherein the characteristics detected by said vehicle characteristic detector means include the number of axles on the vehicle, the width of the tires on the vehicle, and the number of wheels per axle on the vehicle.

10. A system as in claim 1 and wherein the distance between said vehicle characteristic detector means and said ticket issuing means is greater than the length of the longest vehicle using the toll facility.

11. A system as in claim 1 and wherein the distance between said vehicle presence detector means and said first vehicle direction is less than the length of the shortest vehicle using the toll facility.

12. A system as in claim 1 and further comprising separation means placed on both sides of said lane and separating said lane from adjacent traffic.

13. A system as in claim 12 and wherein said separation means bow outwardly from each other downstream from said first vehicle direction means.

14. A system as in claim 1 and wherein said control means further includes memory means for successively storing a plurality of classification codes sequentially classified by said means for classifying, and readout means for successively reading out the classification codes and wherein said means for operating successively, operates said ticket issuing means in accordance with the sequence of classification codes contained in said memory to issue a sequence of tickets in the same sequence as they were contained in said memory means.

15. A system as in claim 1 and wherein said first vehicle direction means is a traffic control signal, said first condition is a green light, and said second condition is a red light.

16. A system as in claim 1 and wherein said first vehicle direction means is a gate and said first condition represents the opened gate and said second condition represents the closed gate.

17. In a vehicle toll facility having a discretely identified signal lane, signal vehicle feed traffic entering terminal and means for automatic detecting of vehicle characteristics, means for automatic classification and ticket issuing at a distance along said single lane from said automatic detection means comprising control means for automatically classifying a vehicle by one of a plurality of classification codes in accordance with said characteristics, and ticket issuing means for automatically issuing a ticket to the appropriate vehicle whose characteristics were detected by said automatic detection means, said ticket having the classification code classified by said control means and further comprising memory means for retaining the classification code classified by said control means until said ticket issuing means issues said ticket bearing that classification code.

* * * * *